United States Patent
Ahmed et al.

(10) Patent No.: US 9,706,413 B2
(45) Date of Patent: Jul. 11, 2017

(54) COMPUTER IMPLEMENTED SYSTEM AND METHOD FOR WI-FI BASED INDOOR LOCALIZATION

(71) Applicant: TATA CONSULTANCY SERVICES LIMITED, Mumbai, Maharashtra (IN)

(72) Inventors: Nasimuddin Ahmed, Kolkata (IN); Chirabrata Bhaumik, Kolkata (IN); Avik Ghose, Kolkata (IN); Arpan Pal, Kolkata (IN); Amit Agrawal, Kolkata (IN); Tapas Chakravarty, Kolkata (IN)

(73) Assignee: Tata Consultancy Services Limited (IN)

( * ) Notice: Subject to any disclaimer, the term of this patent is extended or adjusted under 35 U.S.C. 154(b) by 147 days.

(21) Appl. No.: 14/560,741

(22) Filed: Dec. 4, 2014

(65) Prior Publication Data

US 2015/0257014 A1    Sep. 10, 2015

(30) Foreign Application Priority Data

Mar. 7, 2014 (IN) .......................... 776/MUM/2014

(51) Int. Cl.
| | |
|---|---|
| H04W 16/20 | (2009.01) |
| G01S 5/02 | (2010.01) |
| H04W 4/04 | (2009.01) |
| H04W 24/10 | (2009.01) |

(52) U.S. Cl.
CPC .......... *H04W 16/20* (2013.01); *G01S 5/0252* (2013.01); *H04W 4/04* (2013.01); *H04W 24/10* (2013.01)

(58) Field of Classification Search
CPC ....... H04W 16/20; H04W 4/04; H04W 24/10; G01S 5/0252
USPC ......................................................... 370/255
See application file for complete search history.

(56) References Cited

U.S. PATENT DOCUMENTS

| | | | | |
|---|---|---|---|---|
| 7,257,411 | B2 * | 8/2007 | Gwon ................... | G01S 5/0252 455/115.1 |
| 8,155,081 | B1 * | 4/2012 | Mater ................... | H04W 4/04 370/254 |
| 8,385,943 | B1 * | 2/2013 | Han ...................... | H04W 4/028 455/404.2 |
| 8,639,640 | B1 * | 1/2014 | Kadous ................ | G06N 99/005 342/451 |
| 8,654,672 | B1 * | 2/2014 | Nicholas ............. | H04W 40/246 370/254 |

(Continued)

*Primary Examiner* — Luat Phung
*Assistant Examiner* — Saad A Waqas
(74) *Attorney, Agent, or Firm* — Fishman Stewart PLLC

(57) ABSTRACT

The present disclosure envisages a computer implemented system and method for Wi-Fi based indoor localization. The system includes a repository for storing attributes of the floor plan of an indoor area with respect to the zones on the floor plan. A communicating module receives a threshold number of data points from user devices located in the area. These data points include a plurality of Received Signal Strength Indicators (RSSI) captured from the access points positioned in the area. A k-means clustering is then performed on the data points for grouping the data points into 'k' number of clusters and a decision tree is built by following a condition based approach. Distance values are then calculated pertaining to the RSSIs stored at the decision tree, and zone circles are plotted. Zone of user presence is then determined by correlating the plotted zone circles upon the floor plan using maximum overlap property.

7 Claims, 5 Drawing Sheets

(56) References Cited

U.S. PATENT DOCUMENTS

| | | | |
|---|---|---|---|
| 2005/0246334 A1* | 11/2005 | Tao | H04W 64/00 |
| 2005/0266855 A1* | 12/2005 | Zeng | G01S 5/0252 |
| | | | 455/456.1 |
| 2006/0217132 A1 | 9/2006 | Drummond-Murray et al. | |
| 2007/0247366 A1* | 10/2007 | Smith | G01S 5/021 |
| | | | 342/464 |
| 2012/0072106 A1* | 3/2012 | Han | G01C 21/206 |
| | | | 701/410 |
| 2012/0309410 A1* | 12/2012 | Marti | H04W 4/028 |
| | | | 455/456.1 |
| 2013/0003572 A1 | 1/2013 | Kim et al. | |
| 2013/0079039 A1* | 3/2013 | Heikkilae | H04W 4/025 |
| | | | 455/456.6 |
| 2013/0257657 A1* | 10/2013 | Garin | G01C 21/206 |
| | | | 342/451 |
| 2014/0018096 A1 | 1/2014 | Jagannath | |
| 2015/0195682 A1* | 7/2015 | Lee | H04W 4/04 |
| | | | 455/456.1 |
| 2015/0223189 A1* | 8/2015 | Le Grand | G01S 5/0252 |
| | | | 455/456.3 |
| 2015/0237595 A1* | 8/2015 | Le Grand | G01S 5/0252 |
| | | | 370/338 |

\* cited by examiner

COMPUTER IMPLEMENTED SYSTEM AND METHOD FOR WI-FI BASED INDOOR LOCALIZATION

CROSS REFERENCE TO RELATED APPLICATIONS

This application claims the benefit of Indian Priority Patent Application No. 776/MUM/2014 filed Mar. 7, 2014, the entire contents of which are incorporated herein by reference.

FIELD OF THE DISCLOSURE

The present disclosure relates to the field of indoor localization.

DEFINITIONS

The expression "k-means clustering technique" used hereinafter in this disclosure refers to, but is not limited to, a vector quantization technique used in signal processing. "k-means clustering technique" groups 'n' observations into 'k' clusters, in which each observation belongs to the cluster with the nearest mean.

The expression "Received Signal Strength Indicator (RSSI)" used hereinafter in this disclosure refers to, but is not limited to, the measure of the power level that a Radio Frequency (RF) device, such as a Wi-Fi or a 3G client, receives from a radio infrastructure at a given location and time.

The expression "condition based approach" used hereinafter in this disclosure refers to, but is not limited to, a method of segregating data including a set of values. The method involves classifying data in accordance with a reference value. For example, comparing if each value amongst a set of values is greater than or less than a reference value.

The expression "Access Point (A.P.)" used hereinafter in this disclosure refers to, but is not limited to, wireless devices or Wi-Fi sources installed in an infrastructure for providing network connectivity.

The expression "zone circles" used hereinafter in this disclosure refers to, but is not limited to, an area contained inside a circle that is plotted by considering an Access Point (A.P.) as the center of the circle, and the distance calculated from RSSI value as the radius of the circle.

The expression "maximum overlap" used hereinafter in this disclosure refers to, but is not limited to, the maximum percentage of overlap between the area covered by two figures, surfaces or bodies. In the present case, it refers to the percentage of overlap between the area covered by the plotted zone circles and the area covered by the zones of a floor plan.

The expression "Geometry module" used hereinafter in this disclosure refers to, but is not limited to, a computer module performing the operation of maximum overlap.

The expression "Attenuation module" used hereinafter in this disclosure refers to, but is not limited to, a computer module that takes into account the attenuation or the loss of power of a received signal, and accordingly compensates the received signal strength values.

BACKGROUND

Wi-Fi based indoor localization systems have fostered a growing interest and gained ample attention from researchers lately because of the ubiquitous and inexpensive nature of the required infrastructure. Different technologies are implied with a varying mix of accuracy, stability and challenges such as signal propagation models with trilateration and location fingerprint. Within a room, the signal propagation model works fairly. However due to complicated environment indoor settings and the random effects of signal propagation, it is extremely difficult to build an effective general model of signal propagation that coincides with the real world situation. For Wi-Fi fingerprinting, fine-grained supervised training is normally required to achieve high accuracy and resolution. The database generation, supervised training and deployment requirements are some disadvantages of location fingerprint.

Further, RF based indoor localization solutions require extensive training for fingerprinting, as all of them are supervised machine learning based approaches.

OBJECTS

Some of the objects of the present disclosure aimed to ameliorate one or more problems of the prior art or to at least provide a useful alternative are described herein below:

An object of the present disclosure is to provide an indoor localization system that works without supervision or explicit training.

Another object of the present disclosure is to provide an indoor localization system that is self-learning.

Still another object of the present disclosure is to provide an indoor localization system that does not involve a trilateration technique.

Yet another object of the present disclosure is to provide an indoor localization system that is robust and accurate.

SUMMARY

A computer implemented system and method for indoor localization is disclosed in accordance with an embodiment of the present disclosure. In the current disclosure, a model driven system is used to eliminate the training phase and make the system scalable to new environments as well as accepting changes in existing environments. Using model driven extrapolation, the system can also achieve localization in regions, which cannot be triangulated, as trilateration base approach requires Wi-Fi access points to be placed in specific geometric positions.

The computer implemented system of present disclosure includes a repository, a communicating module, a clustering module, a decision module, a distance-estimating module, and a geometry module. The repository stores at least one attribute selected from the group consisting of a floor plan of an indoor area including zone details, zone boundaries, building materials and location of different access points with respect to the zones on the floor plan. The communicating module receives a threshold number of data points from at least one user device located in the area, wherein each of the data point includes a plurality of Received Signal Strength Indicators (RSSI) captured from the access points positioned in the area. The clustering module cooperates with the communicating module and performs a k-means clustering technique on the data points for grouping the data points into 'k' number of clusters. The decision module cooperates with the clustering module and builds at least one decision tree using the RSSIs of each point in the cluster of data points, and the decision tree is built by following a condition based approach. These conditions are related to the values of the RSSIs related to each of the access points.

The distance-estimating module that cooperates with the decision module, calculates distance values pertaining to the RSSIs stored at the decision tree, and plots zone circles. These zone circles are plotted using the distance values as radii of the zone circles and the access points as centers of the respective zone circles. The geometry module cooperates with the distance-estimating module and the repository to determine the zone of user presence by correlating the plotted zone circles upon the floor plan using maximum overlap property. The geometry module is further connected to the communicating module for transferring the information regarding the zone of user presence.

A computer implemented method for indoor localization is also disclosed in accordance with an embodiment of the present disclosure. The method comprises the following:
- storing, in a repository, the floor plan of an indoor area including zone details, zone boundaries, building materials and location of different access points with respect to the zones on the floor plan;
- collecting a threshold number of data points from at least one user device located in the area, wherein each of the data points includes a plurality of Received Signal Strength Indicators (RSSI) captured from the access points positioned in the area;
- performing a k-means clustering technique on the data points for grouping the data points into 'k' number of clusters;
- building at least one decision tree using the RSSIs contained by the cluster of data points, wherein the decision tree is built by following a condition based approach, and wherein the conditions are related to the values of the RSSIs related to each of the access points;
- calculating distance values pertaining to the RSSIs stored at the decision tree and plotting zone circles, wherein the zone circles are plotted using the distance values as radii of the zone circles, the access points being as centers of the zone circles; and
- determining the zone of user presence by correlating the plotted zone circles upon the floor plan using maximum overlap property.

BRIEF DESCRIPTION OF ACCOMPANYING DRAWINGS

The computer implemented system and method for Wi-Fi based indoor localization will now be described with the help of accompanying drawings, in which.

DETAILED DESCRIPTION

The invention will now be described with reference to the embodiments shown in the accompanying drawings. The embodiments do not limit the scope and ambit of the invention. The description relates purely to the exemplary preferred embodiments of the invention and its suggested application.

Figure 1:
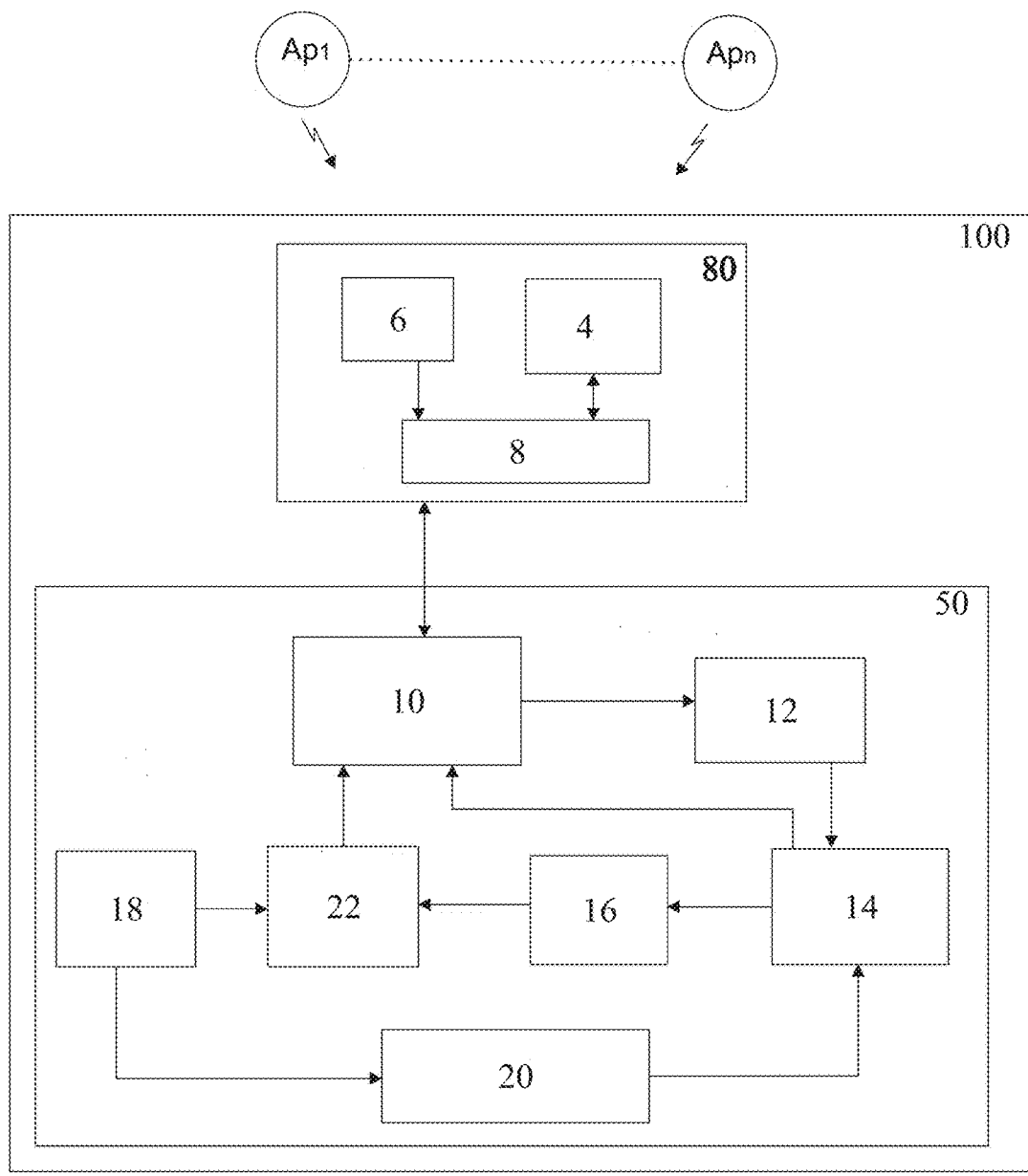
FIG. 1 illustrates a block schematic of the computer implemented Wi-Fi based indoor localization system, in accordance with the present invention.

Referring the accompanying drawing, FIG. 1 shows a block schematic of the computer implemented system for Wi-Fi based indoor localization (100). The system (100) includes a user device (80) and a server (50). The user device (80) present with the user is connected to the remote server (50) via a network. In one embodiment, the network is a wireless network. However, the network may be a wired network or a combination of the wired and the wireless network.

In accordance with an embodiment of the present invention, an infrastructure comprises of various access points installed therein at different locations. Generally, these access points are Wi-Fi sources like routers positioned for providing network connectivity within the premises of the infrastructure. The user device (80) enabled with Wi-Fi measures strength of signals coming from different access points. The signal strengths received from various access points differ in magnitude because of the distance of the access points with respect to the user device (80). Further, the received signal strengths are also affected due to any obstruction material present on a floor of the infrastructure. These obstruction materials includes the walls or boundaries made of different construction materials like cement, gypsum, glass, wood. A piece of furniture present on the floor may also provide obstruction to the signal traveling through it. Each floor of the infrastructure is divided into areas called as 'zones'.

The signal strength values recorded by the user device (80) are known as Received Signal Strength Indicator (RSSI). The user device (80) present with the user traveling through different zones on the floor at any point of time, captures a set of RSSI values from different access points. The set of RSSI values received from different access points is called as a data point. The user device (80) identifies each access point using the machine Identification code (MAC ID) values received along with the RSSI values.

During an initial mode of operation, the user device (80) is kept in scanning mode in order to collect data point values at different locations while passing through different zones of a floor. The user device (80) includes a Wi-Fi module (6) connected to a processor (8). The Wi-Fi module (6) is adapted to capture data point values while the user moves across the infrastructure. The processor (8) at periodic intervals, transmits the captured data point values to the remote server (50) communicating with the user device (80). The user device (80) further includes a user memory (4) connected to the processor (8).

In accordance with an embodiment of the present invention, the server (50) comprises a communicating module (10) which receives the data point values transmitted by the user device (80). The communicating module (10) is in connection with a clustering module (12). Upon receiving a minimum number of data point values, the communicating module (10) provides the received set of data point values to the clustering module (12). The clustering module (12) employs a vector quantization technique like k-means clustering on the received data point values. The value of 'k' is set to the number of zones present on the floor. The k-means clustering method employed by the clustering module creates 'k' number of clusters and places each of the data point into one of the 'k' clusters depending on the cluster with the nearest mean. For example, there are 'x' zones on a floor. k-means clustering method is applied to cluster the data points into 'x' distinct cluster. Each data point is tagged with one of the clusters in this process. After the process of cluster formation by the clustering module (12), the clustered data point values are transferred to a decision module (14) connected to the clustering module (12).

The decision module (14) receives the clustered data point values provided by the clustering module (12). The data points are organized based on the RSSI values of each point in the cluster of data points. By continuous organization of the data points by the decision module (14), a branched data structure is created. This branched data structure is referred to as the decision tree. The decision tree represents an if-else ladder structure and each leaf node of the branched tree represents a cluster.

Figure 2:
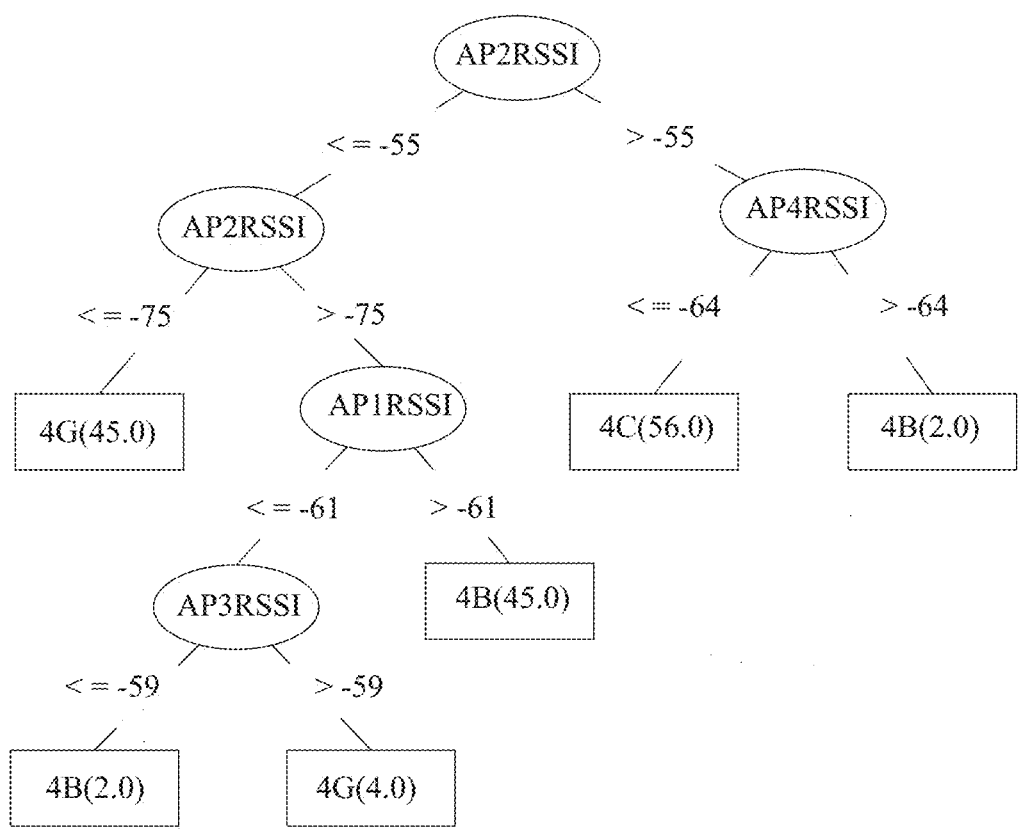
FIG. 2 illustrates a sample decision-tree, in accordance with the present invention.

Referring to FIG. 1 and FIG. 2, a sample decision tree in accordance with the present disclosure is shown in FIG. 2. RSSI value of each access point measured in a cluster is organized. The branched data structure shows first level of organization of access points based on the RSSI value. First level of organization includes categorization of the access point AP2 based on the RSSI value less than or equal to (<=)–55, and RSSI value greater than (>)–55. Further, the second level of organization involves categorization of the access point AP2 based on the RSSI value less than or equal to (<=)–55 into RSSI values less than or equal to (<=)–75 and RSSI value greater than (>)–75. The process of organization goes on in the described manner until not all the RSSI values corresponding to the access points of a cluster are categorized.

The decision module (14) upon development of a decision tree, transfers the union of values to a distance-estimating module (16) connected to the decision module (14). The distance-estimating module (16) receives the union of RSSI values and converts the RSSI values into distances using the below mentioned free-space propagation formula, $$d = e^{(RSSI - Unit\ RSSI)/10n} \quad (1)$$

where, RSSI=RSSI at distance 'd', and
Unit RSSI=RSSI at unit distance (measured)

The optimum value of free-space propagation co-efficient is selected as 2.8, based on the conducted experiments.

The distance values calculated by the distance-estimating module (16) using the equation 1, are stored into a distance matrix maintained at the distance-estimating module (16). The distance-estimating module (16) plots zone circles using the calculated distance values. Considering the access point as the center, zone circles are plotted using the calculated distances as the radii of the zone circles. The plotted zone circles are then transferred to a geometry module (22) for detecting zone of user presence. The geometry module (22) is further connected to a repository (18). The repository (18) includes the information related to but not limited to the location of different access points installed within the infrastructure, MAC ID of all the installed access points, floor map, zone boundary, dimensions of different areas on each floor. The repository (18) further holds the information regarding different obstruction materials present in each zone of every floor, position of the obstruction materials and their corresponding attenuation factors.

Figure 3:
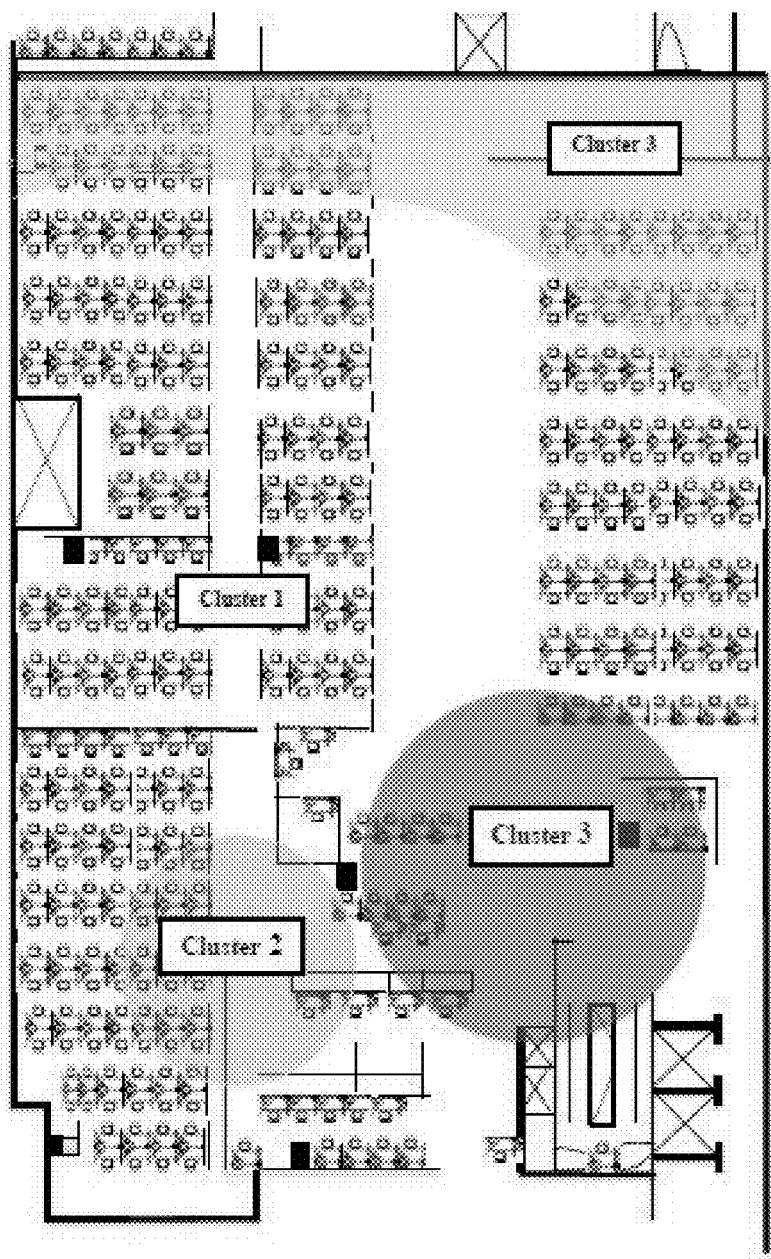
FIG. 3 illustrates the process of mapping of zone circles to physical zones, in accordance with the present invention.

Referring to FIG. 1 and FIG. 3, mapping of zone circles to physical zones in accordance with the present disclosure is shown in FIG. 3. The geometry module (22) correlates the zone circles with the physical zones present in the floor map stored in the repository (18). The zone circles are correlated with physical zones using a maximum overlap function in coordinate geometry space. The physical zone discovered with a maximum overlap area is found to be the zone of user presence. Thus, the zone of user presence is recorded at the server (50).

In this manner, the physical zone of user presence is determined automatically using the computer-implemented system for Wi-Fi based indoor localization (100), and thus eliminating the need of manual supervision as required in the conventional processes.

The system (100) further includes an attenuation module (20) connected to the repository (18) and the decision module (14). Each signal while traveling from an access point to the user device (80) experiences attenuation due to various obstruction materials coming across the way. The obstruction materials may include but are not limited to different building constituents like cement, concrete, gypsum, glass and other metal or wooden articles present on the floors. The attenuation module (20) receives from the repository (18), the information regarding the position of the obstruction materials present in each zone of every floor and their corresponding attenuation factors. The attenuation module (20) calculates the compensated RSSI values for the zone boundaries considering the attenuation factors. These compensated RSSI values are then updated to the RSSI values present at the decision tree stored at the decision module (14). Thus, the attenuation module (20) leads to enrichment of the decision tree structure upon considering physical attenuation factors resulting from the constituents of the infrastructure to provide a compensated decision tree. In this manner, the attenuation module (20) improves the accuracy of zone identification and hence improves performance of the system (100).

The system (100) further takes care of dynamic obstructions like moving persons. In case a moving person comes into the line of sight, he blocks the signal at that point of time. The user device (80) misses a reading at time 't', but receives a reading at time 't+Δt', while the moving obstruction moves away from the line of sight. In this manner, the system takes care of dynamic obstructions by continuous learning of the readings.

The decision module (14) communicates with the communication module (10) for transferring the compensated decision tree. The compensated decision tree stored at the decision module (14) is transferred to the user device (80) through the communicating module (10). The processor (8) connected to the user memory (4) of the user device (80) receives and stores, the compensated decision tree.

During a refinement mode of operation, the user device (80) having the stored compensated decision tree travels again into a zone of the infrastructure. The user device (80) having the Wi-Fi module (6) kept in scanning mode, starts capturing the data point values. The newly captured data point values include the RSSI values from different nearby located access points. The processor (8) of the user device (80) starts matching the newly captured RSSI values with the compensated decision tree holding all previously captured RSSI values tagged with zone information. Upon discovering a successful match, the processor (8) of the user device (80) identifies the zone of user presence.

The Wi-Fi module (6) connected to the processor (8) of the user device (80) continues capturing the data point values, and transmits them to the server (50) periodically, for improving the decision tree maintained at the decision module (14) of the server (50). Any newly added or removed access point is automatically detected by the system (100) upon continuous processing of the new RSSI values and the decision tree is updated accordingly. The decision module (14) follows the hierarchy of categorization and accordingly places and stores a newly detected access point at a suitable position in the decision tree. This provides the system (100) with self-learning ability and automatic adaptability to the environmental changes.

Figure 4:
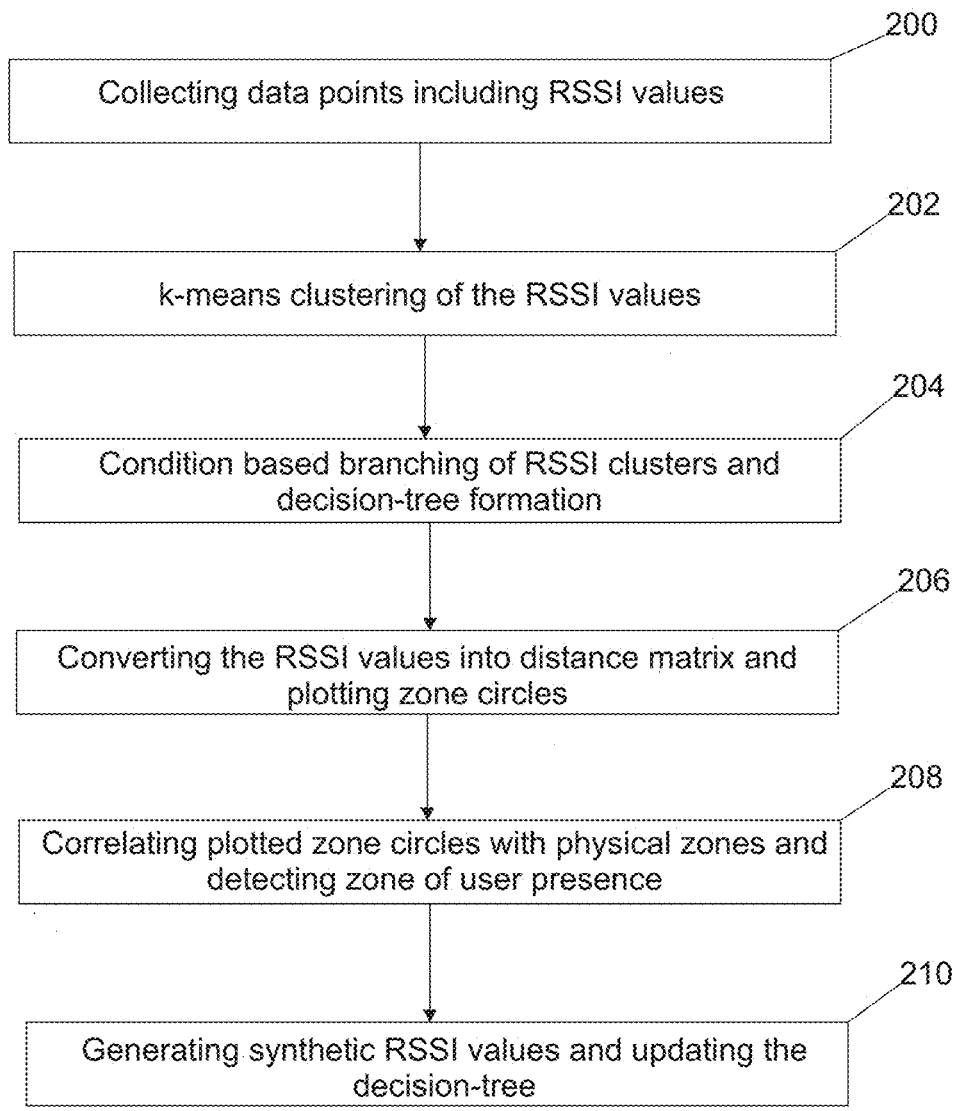
FIG. 4 illustrates a flow diagram showing the steps involved during the process of Wi-Fi based indoor localization, in accordance with the present invention.

Referring to FIG. 4, there is shown a flow diagram corresponding to the process of Wi-Fi based indoor localization. The method includes the following steps:
- collecting data points including RSSI values (200);
- k-means clustering of the RSSI values (202);
- condition based branching of RSSI clusters and decision-tree formation (204);
- converting the RSSI values into distance matrix and plotting zone circles (206);
- correlating plotted zone circles with physical zones and detecting zone of user presence (208); and
- generating compensated RSSI values and updating the decision-tree (210).

Figure 5:
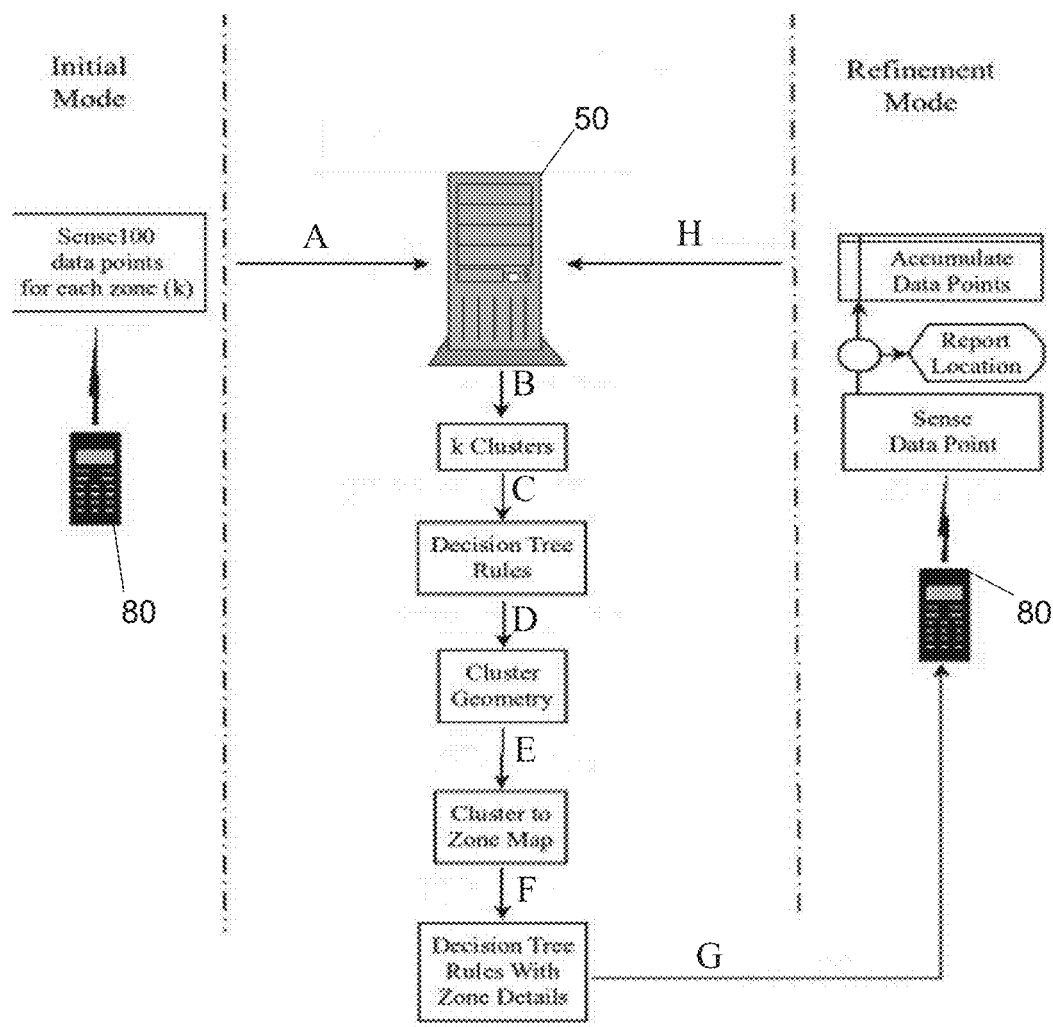
FIG. 5 illustrates the modes of operation of the computer implemented Wi-Fi based indoor localization system.

In accordance with an exemplary embodiment of the present disclosure, FIG. 5 shows the initial and the refinement mode of operation of the computer implemented Wi-Fi based indoor localization system. The system includes a server (50) having preconfigured static configuration information. The information is related to the following factors:
1. Floor plan geometry,
2. Access points geometry,
3. Zone boundaries,
4. Obstruction material information including the geometry of floor plan, type of material and thickness of the material used, and
5. Attenuation factor of the obstruction materials.

During an initial mode of operation, the user device (80) moves around the floor of an indoor environment and scans the Wi-Fi signals for capturing RSSI values. There are 'x' zones on a floor. The user device (80) collects 100 data point values, set as the threshold limit, for each zone of the floor. The user device (80) transmits the 100 data point values indicative of RSSI values to the server (50), indicated by step A, for further processing.

The server (50) applies a k-means clustering technique on the 100 data point values, indicated by step B. The 100 data point values are clustered into 'k' groups upon application of the clustering technique. Each data point is tagged with one of the 'k' clusters. Value of 'k' is equal to 'x', which is the number of zones on the floor.

Each cluster of data point values is provided to decision tree classifier, indicated by step C. The classifier generates a decision tree using the cluster of data point values. Decision tree is a set of rules (if-else ladder structure) providing an exact condition for the RSSI value of each data point to lie in one cluster or the other. For example, a node representing the rule,
    if (Access_Point1_RSSI<−51 db AND Access_Point2_RSSI<−31 db): indicates cluster1,
    else if (Access_Point2_RSSI<−31 db AND Access_Point4_RSSI<−41 db)): indicates cluster2, and
    else: indicates cluster 3
'AND' used in the rules specifies the intersection.

All the rules of the decision tree are used for geometry calculation, as indicated by step D. Each individual rule is converted into a circle with specified access point as the center of the circle and distance (converted from RSSI using equation 1) as radius of the circle. Inequality condition represents a region interior/exterior to the circle based on the inequality and, equality condition represents periphery of the circle.

All the rules from the decision tree are split into individual rules and are converted to geometry. The Cluster geometry is calculated by intersecting all the geometries corresponding to individual rules associated with each cluster. In case of multiple conditions in the decision tree for a particular cluster, union of the corresponding geometries is considered as cluster geometry.

The server calculates area overlap between the clusters geometry and the static zone geometry, as indicated by the step E. The static zone geometry refers to the geometry of the zone areas indicated by the static parameters stored at the server (50). The maximum area overlap of the cluster with the particular zone is used to tag the cluster with that particular zone.

Once the zones are identified upon overlapping, the decision tree is updated to reflect the zones, as indicated by step F. In case of maximum overlap of cluster1 with Zone_X, cluster2 with Zone_Y and, cluster3 with Zone_Z, decision tree rules are updated as below:
    if (Access_Point1_RSSI<−51 db AND Access_Point2_RSSI<−31 db): is tagged with Zone_X,
    else if (Access_Point2_RSSI<−31 db AND Access_Point4_RSSI<−41 db)): is tagged with Zone_Y, and
    else: is tagged with Zone_Z.
Each condition is tagged with the corresponding zone, as shown above.

The server (50) transfers the decision tree rules with zone details to the user device (80), as indicated by step G. The user device (80) stores the decision tree into the user memory (4). The user device (80) senses a new location data point and searches in the decision tree to locate the user's zone of presence. In addition, the user device (80) keeps accumulating data points for further refinement.

During a refinement mode of operation, the system (100) has the decision tree stored in the user memory (4) and is working. The major objective of this mode is to improve the accuracy of the system by continuous learning. The user device (80) again collects data points up to a threshold level of 100 and transmits them to the server (50) for further refinement. These data point values are processed in a manner similar to the initial mode of operation. With the increasing number of data points, the decision tree is refined and improved at every level. The refined decision tree with updated set of values is transferred to the user device (80) for continuous improvement and providing better results.

TECHNICAL ADVANCEMENTS AND ECONOMIC SIGNIFICANCE

The technical advancements offered by the present disclosure include the realization of a computer-implemented system and method for Wi-Fi based indoor localization having the following technical advantages:
- manual supervision and explicit training is eliminated and system works automatically;
- self-learning is provided;
- trilateration technique is not involved; and
- robustness and accuracy are improved.

While considerable emphasis has been placed herein on the components and component parts of the preferred embodiments, it will be appreciated that many embodiments can be made and that many changes can be made in the preferred embodiments without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A computer implemented method for indoor localization, said method comprising:
   storing, in a repository, a floor plan of an indoor area including zone boundaries, attenuation factors corresponding to a plurality of obstruction materials, and locations of the plurality of obstruction materials and access points with respect to a number of zones on the floor plan;
   collecting a threshold number of data points from at least one user device located in said area, wherein each of the data points includes a plurality of Received Signal Strength Indicators (RSSI) captured from the access points positioned in said area;
   performing a k-means clustering technique on the data points for grouping the data points into 'k' number of clusters, wherein each of the data points is placed in a respective one of the 'k' number of clusters with the nearest mean and the value of 'k' is set to the number of zones on the floor plan;
   building at least one decision tree using the RSSIs contained by the cluster of data points, wherein the decision tree is built by following a condition based approach, and wherein the conditions are related to the values of the RSSIs related to each of the access points;
   calculating, while considering the attenuation factors corresponding to obstruction materials, distance values pertaining to the RSSIs by applying exponential function on the RSSIs stored at the decision tree and plotting zone circles, wherein the zone circles are plotted using the distance values as radii of the zone circles, the access points as centers of the respective zone circles; and
   determining a zone of user presence by correlating the plotted zone circles upon the floor plan using maximum overlap property.

2. The method of claim 1, wherein said method comprises:
   generating compensated RSSI values for the zones on the floor plan, wherein the compensated RSSI values are generated by considering attenuation factors offered by obstruction materials of zone boundaries on the captured RSSI values; and
   updating the decision tree using the compensated RSSI values.

3. The method of claim 1, wherein said method further comprises:
   transmitting the decision tree to a user device located in said indoor area;
   storing the decision tree in the memory of the user device;
   capturing a current data point including current RSSI values; and
   determining the zone of user presence of the user device, wherein the zone is determined by comparing the current RSSI values with the RSSI values associated with the decision tree.

4. The method of claim 1, wherein said method includes a step of recording a reading at time t+Δt, when a dynamic obstruction moves away from a line of sight in the indoor area.

5. A computer implemented system for indoor localization, said system comprising:
   a repository configured to store in relation to an indoor area, at least one attribute selected from the group consisting of a floor plan including zone boundaries, attenuation factors corresponding to a plurality of obstruction materials, and locations of the plurality of obstruction materials and access points with respect to a number of zones on the floor plan;
   a communicating module configured to receive a threshold number of data points, wherein each of the data point includes a plurality of Received Signal Strength Indicators (RSSI) captured from the access points positioned in said area;
   a clustering module connected to the communicating module, wherein the clustering module is configured to perform a k-means clustering technique on the data points for grouping the data points into 'k' number of clusters, wherein each of the data points is placed in a respective one of the 'k' number of clusters with the nearest mean and the value of 'k' is set to the number of zones on the floor plan;
   a decision module connected to the clustering module and the communicating module, wherein the decision module is configured to build at least one decision tree using the RSSIs of each point in the cluster of data points, and wherein the decision tree is built by following a condition based approach, and wherein the conditions are related to the values of the RSSIs related to each of the access point;
   a distance-estimating module connected to the decision module, wherein the distance-estimating module is configured to calculate, while considering the attenuation factors corresponding to obstruction materials, distance values pertaining to the RSSIs by applying exponential function on the RSSIs stored at the decision tree and further configured to plot zone circles, wherein the zone circles are plotted using the distance values as radii of the zone circles and the access points as centers of the respective zone circles; and
   a geometry module connected to the distance-estimating module and the repository, wherein the geometry module is configured to determine a zone of user presence by correlating the plotted zone circles upon the floor plan using maximum overlap property.

6. The system of claim 5, further comprising, an attenuation module connected to:
   the repository for generating compensated RSSI values for the zones of the floor, wherein the compensated RSSI values are generated by considering attenuation factors offered by obstruction materials of zone boundaries on captured RSSI values; and
   the decision module for updating the decision tree using the compensated RSSI values, wherein the compensated decision tree is communicated to the communicating module.

7. The system of claim 5, further comprising, a user device comprising:
   a Wi-Fi module adapted for continuously recording current RSSI values of data points captured from the access points;
   a user memory adapted to store the data point values recorded by the Wi-Fi module and the decision tree received from the communicating module; and
   a processor adapted to receive from the communicating module, the information regarding the zone of user presence, and further determine the current zone in which user is present, wherein the zone is determined by comparing the current RSSI values with the RSSI values pertaining to the decision tree.

* * * * *